L. A. TRULL.
WAVE MOTOR.
APPLICATION FILED DEC. 23, 1912.

1,078,324.

Patented Nov. 11, 1913.

Witnesses:
H. B. Davis.
C. Doyle.

Inventor:
Lyman A. Trull
by Hays & Harriman
attys.

UNITED STATES PATENT OFFICE.

LYMAN A. TRULL, OF MANCHESTER, NEW HAMPSHIRE.

WAVE-MOTOR.

1,078,324.  Specification of Letters Patent. Patented Nov. 11, 1913.

Application filed December 23, 1912. Serial No. 738,204.

*To all whom it may concern:*

Be it known that I, LYMAN A. TRULL, a citizen of the United States, residing at Manchester, in the county of Hillsboro and State of New Hampshire, have invented an Improvement in Wave-Motors, of which the following is a specification.

This invention relates to improvements in wave-motors.

The object of the invention is to provide a wave-motor comprising a float arranged to be anchored at any convenient location, and one or more air compressing-devices in which the water forms the piston.

Figure 1:
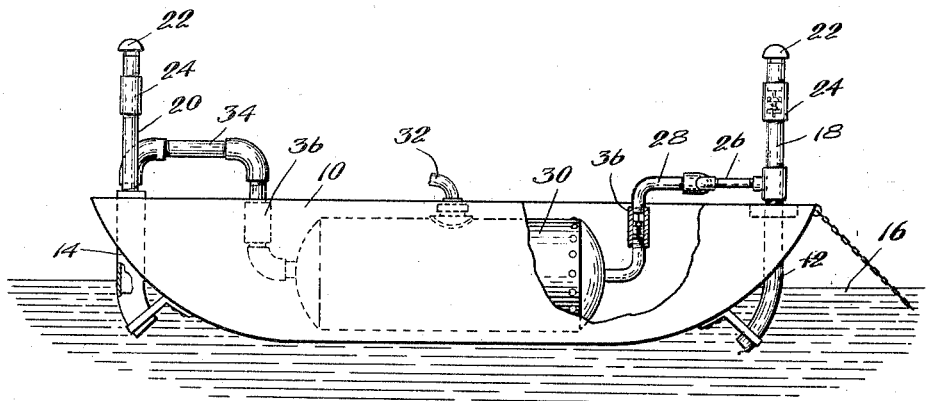
Figure 2:
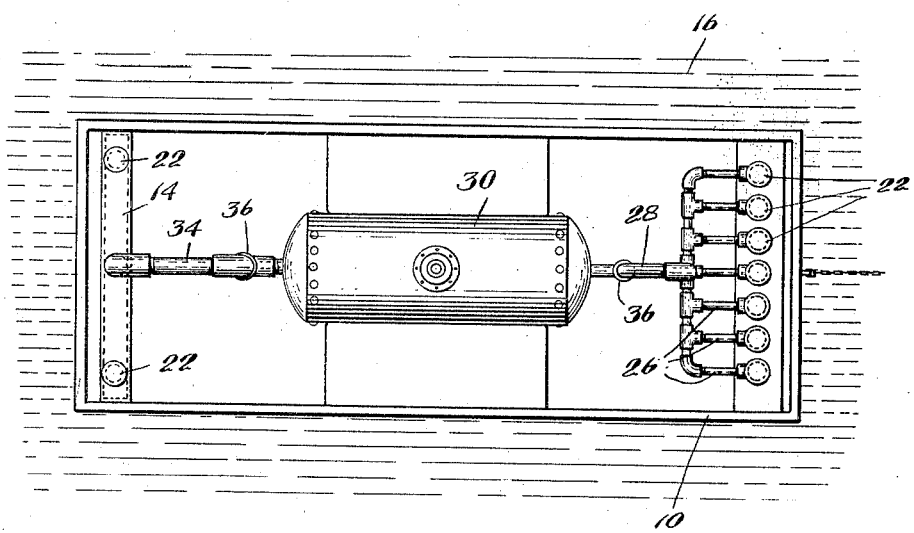

In the accompanying drawing, Figure 1 is a side elevation of an illustrative embodiment of the invention, and Fig. 2 is a plan view of the same.

As illustrated in said drawings, the motor comprises a float 10, which may be in the form of a scow, having one or more tubular structures or pipes 12, 14, supported at each end. As here shown pipes 12 are arranged at one end and a tubular structure at the other end to illustrate two of the many different forms of devices which may be employed. The pipes 12 are circular in cross-section and open at their lower ends and may have their lower portions curved somewhat, to present their lower open ends substantially perpendicular to the surface of the water 16 when the corresponding end of the scow dips. The tubular member or pipe 14 is preferably rectangular in cross-section and open at its lower end, thus presenting a large area to the action of the water. The lower ends of the tubular structures 12 and 14, may be covered by screens to keep out foreign matter.

The tubular members 12 and 14 are provided at their upper ends with air-intake pipes 18, 20, having their upper ends provided with a hood 22, so constructed and located above the surface of the water that the air is admitted, but the spray is excluded. The pipes 18 and 20 are provided with check-valves 24 which allow air to be drawn into the compressor-members 12, 14, when they are moving upward.

The tubular members 12 are connected by individual pipes 26 to a common pipe 28 which communicates with a storage tank or reservoir 30 located on the scow, and a flexible hose or pipe 32 leads from said tank to any desired locality where the compressed air is to be used. The tubular member 14 is connected by a pipe 34 to the storage tank, and the pipes 28 and 34 are also provided with check-valves 36.

Although I have shown a group of circular tubes or cylinders at one end of the float and a single rectangular tube of large area at the other, it will be understood that the relative sizes, shapes and numbers of compressors may be varied at either end as desired.

From the construction above set forth it will be understood that when one end of the float dips, the water is forced up into the corresponding tubular structure or structures, thus acting as a piston to compress the air above it, and on the upward movement of said end air is drawn in at the upper end thereof, through the air-intake pipe connected therewith, or is taken in at the open end thereof.

I claim:—

A wave motor comprising a float, one or more tubular structures mounted above at one or more edges of said float, said tubular structures having their lower open ends at all times beneath the normal water line of the float, the said open ends being arranged to maintain their edge plane at an angle other than a right angle to the water line when below the water level and in parallelism with said water line when adjacent the water line.

In testimony whereof, I have signed my name to this specification, in the presence of two subscribing witnesses.

LYMAN A. TRULL.

Witnesses:
 ELIZABETH K. HARVEY,
 MICHAEL J. DRISCOLL.